United States Patent
Kurosawa

(10) Patent No.: US 6,771,752 B1
(45) Date of Patent: *Aug. 3, 2004

(54) COMMUNICATION APPARATUS CAPABLE OF COMMUNICATION WITH SINGLE PARTNER USING A PLURALITY OF COMMUNICATION CHANNELS, AND CONTROL METHOD THEREOF

(75) Inventor: Yuji Kurosawa, Kashiwa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,788

(22) Filed: Apr. 6, 1999

(30) Foreign Application Priority Data

Apr. 8, 1998 (JP) ............................................ 10-095518
Mar. 31, 1999 (JP) ............................................ 11-090491

(51) Int. Cl.[7] ............................ H04M 11/00; H04J 3/00
(52) U.S. Cl. ............................ 379/100.16; 379/100.17; 370/524; 370/536; 370/540
(58) Field of Search ....................... 379/100.15, 100.16, 379/93.09, 93.11, 100.01, 114.07, 93.05, 100.17; 370/524, 357.05

(56) References Cited

U.S. PATENT DOCUMENTS

| | | | | |
|---|---|---|---|---|
| 5,042,028 A | * | 8/1991 | Ogawa | 370/359 |
| 5,495,485 A | * | 2/1996 | Hughes-Hartogs | 358/442 |
| 5,555,294 A | * | 9/1996 | Abe | 379/100.15 |
| 5,854,830 A |  | 12/1998 | Kenmochi | |
| 5,946,319 A | * | 8/1999 | Kobayashi | 370/420 |
| 5,963,620 A | * | 10/1999 | Frankel et al. | 379/93.05 |
| 6,047,006 A | * | 4/2000 | Brakefield et al. | 370/524 |
| 6,125,127 A | * | 9/2000 | Smith, Jr. | 370/524 |

* cited by examiner

Primary Examiner—Fan Tsang
Assistant Examiner—Simon P. Sing
(74) Attorney, Agent, or Firm—Morgan & Finnegan, L.L.P.

(57) ABSTRACT

In order to allow various user setups associated with a communication using a plurality of communication channels, the number of communication channels used in a communication with a single partner is varied depending on whether or not the automatic answering mode is set. The number of communication channels used in the communication with the single partner can be independently set in correspondence with transmission and reception. The number of communication channels used in the communication with another communication partner can be independently set in correspondence with whether an incoming call or a call origination request is detected.

5 Claims, 11 Drawing Sheets

FIG. 6

| G4 / G3 | TRANSMISSION | RECEPTION |
|---|---|---|
| | G4 : GRANT<br>G3 : DENIAL | G4 : GRANT<br>G3 : GRANT |
| ANALOG PORT 1 | DENIAL | GRANT |
| ANALOG PORT 2 | DENIAL | DENIAL |
| ANALOG PORT 3 | GRANT | DENIAL |
| ... | ... | ... |
| NO DESIGNATION | | DENIAL |

FIG. 11

| | | TRANSMISSION | RECEPTION |
|---|---|---|---|
| BULK COMMUNICATION UPON RECEPTION | G4 / G3 | G4 : GRANT<br>G3 : DENIAL | G4 : GRANT<br>G3 : GRANT |
| | ANALOG PORT 1 | DENIAL | GRANT |
| | ANALOG PORT 2 | ... | ... |
| | EXTERNAL PC | ... | ... |
| | NO DESIGNATION | ... | ... |
| BULK COMMUNICATION UPON TRANSMISSION | G4 / G3 | G4 : DENIAL<br>G3 : DENIAL | G4 : GRANT<br>G3 : GRANT |
| | ANALOG PORT 1 | DENIAL | GRANT |
| | ANALOG PORT 2 | ... | ... |
| | EXTERNAL PC | ... | ... |
| | NO DESIGNATION | | |

COMMUNICATION APPARATUS CAPABLE OF COMMUNICATION WITH SINGLE PARTNER USING A PLURALITY OF COMMUNICATION CHANNELS, AND CONTROL METHOD THEREOF

BACKGROUND OF THE INVENTION

1. Field of the Invention

The present invention relates to a communication apparatus capable of communications with a single partner using a plurality of channels, its control method, and a computer readable recording medium that stores the control method.

2. Description of the Related Art

In recent years, communication apparatuses that use an ISDN (Integrated Services Digital Network) line such as a G4 facsimile apparatus, digital telephone set, TA (terminal adapter), ISDN router, and the like have prevailed.

As one feature of ISDN, communications can be made using a plurality of channels (so-called 2B+1D channels) at the same time via a single office line. For example, communications can be made using one B-channel by a telephone set and the other channel by a facsimile apparatus at the same time.

Furthermore, a so-called bulk communication mode that communicates with a single communication partner using two B-channels can be used although this mode depends on the application/network protocol of the host. In this bulk communication, the two channels are connected by different origination control processes, and communications using these channels are charged separately.

However, conventional ISDN communication apparatuses have a very narrow user setup range for the bulk communication.

More specifically, an arrangement that allows user setups as to whether or not a bulk communication is to be made is known. However, in the conventional arrangement, the user can merely select unconditionally whether or not the bulk communication is used. That is, in the conventional arrangement, if "use bulk communication" is set, a bulk communication request is always issued to the partner, and a bulk communication is executed in response to a request from the partner. On the other hand, if "not use bulk communication" is set, no bulk communication request is issued to the partner, and a bulk communication request from the partner is not granted.

Hence, the transmitting (calling party) side nearly solely has the right to decide as to whether or not a bulk communication is made, and the receiving (called party) side can only set to decline a bulk communication. In this case, a bulk communication request cannot be issued upon transmitting (placing) a call by the own apparatus.

More specifically, the conventional arrangement can only control reception (termination) and transmission (origination) under the same setup, i.e., can only grant or deny bulk communications for both of reception (termination) and transmission (origination) as a set, and does not allow the user to independently set grant/denial for bulk communications in reception (termination) and transmission (origination).

Also, in the conventional, upon receiving a bulk communication request, it is impossible to attain flexible control for determining according to various conditions whether or not that request is accepted.

As another problem experienced in bulk communications, once a given apparatus (a router, facsimile apparatus, or the like) has started a bulk communication, another apparatus such as a telephone set cannot communicate since both channels are busy, and an incoming call cannot be received.

As a technique for solving this problem, in a TA (terminal adapter), ISDN router, or the like, a technique called a resource BOD (Bandwidth On Demand) or the like, i.e., a technique for automatically selecting a 1B connection upon detection of an outgoing/incoming call from/to an analog port or a digital terminal connected to another S T point during a bulk (2B) communication is known.

Also, a technique for determining whether or not a bulk communication is made, in accordance with the accumulated use frequency of channels (lines) or the line use charge at the current time, and a technique for dynamically increasing/decreasing the number of channels to be used in correspondence with the volume of transfer data per unit time (so-called throughput BOD) are known.

However, most of the conventional bulk communication control techniques such as BOD and the like are associated with a synchronous PPP (Point to Point Protocol) of a standalone TA, and do not consider how to control bulk communications of a plurality of bulk communication-compatible apparatuses connected.

For example, when a plurality of resource BOD-compatible apparatuses are connected, when one apparatus starts a communication during a bulk communication of the other apparatus, the apparatus that has already started the bulk communication always gives away the channel it is using. However, such situation is not always desirable when the other apparatus is making a communication which requires high communication rate. Depending on the user's purpose, a given one of a plurality of apparatuses often always has a low communication priority order. However, since the prior art does not consider such priority at all, a bulk communication which is underway may be interrupted by an apparatus with low communication priority.

SUMMARY OF THE INVENTION

It is an object of the present invention to allow various user setups in relation to communications using a plurality of communication channels.

It is another object of the present invention to set the number of communication channels for a communication in an automatic answering mode.

It is still another object of the present invention to improve convenience of a communication apparatus capable of communications with a single partner using a plurality of communication channels.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a table showing an example of communication control setups in the third embodiment;

FIG. 11 is a table showing an example of communication control setups in the fifth embodiment.

DESCRIPTION OF THE PREFERRED EMBODIMENTS

The preferred embodiments of the present invention will be described hereinafter with reference to the accompanying drawings.

First Embodiment

Figure 1:
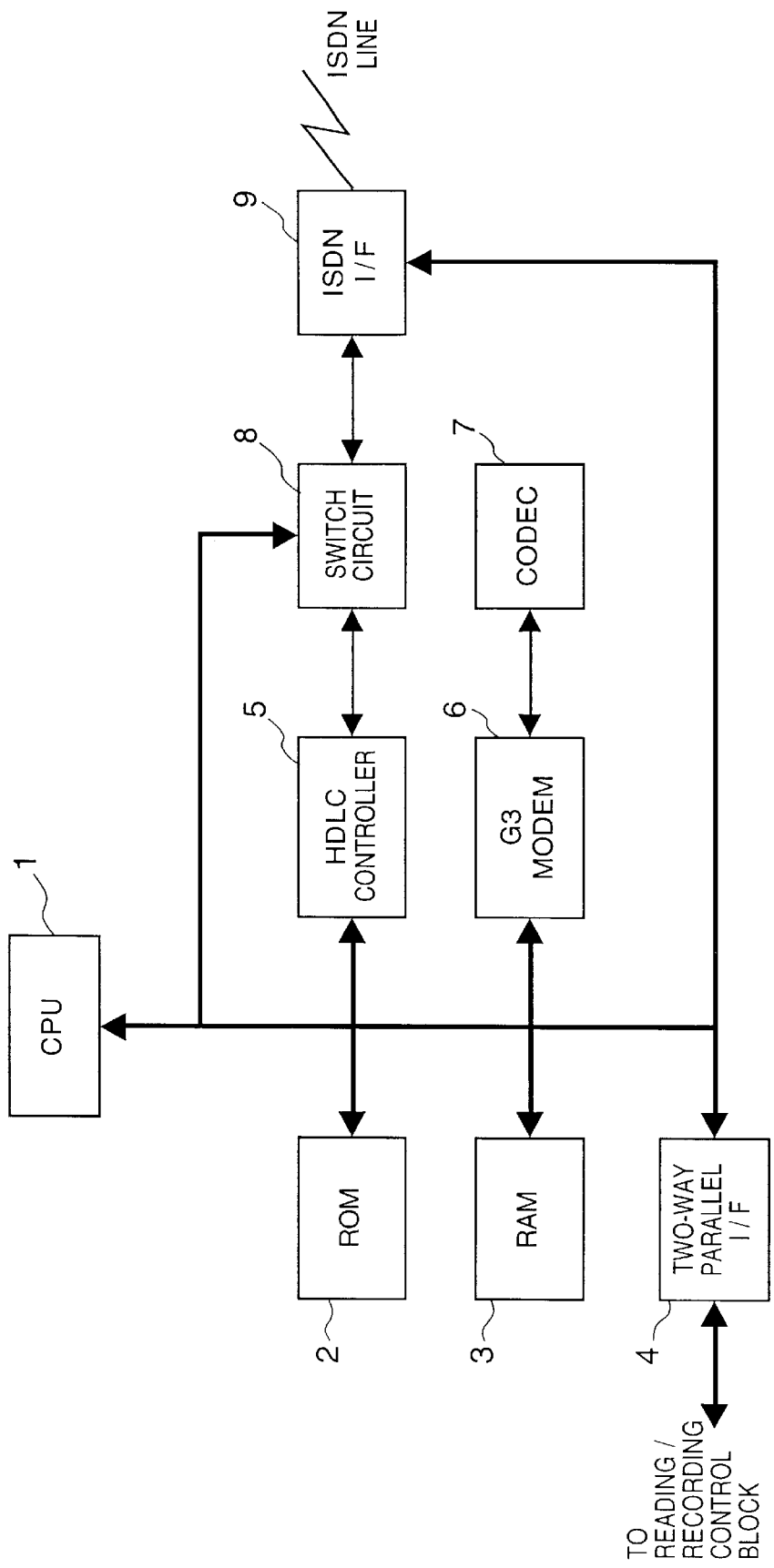
FIG. 1 is a block diagram showing the arrangement of a communication control block according to the first and second embodiments of the present invention.

FIG. 1 shows the arrangement of communication control blocks of a facsimile apparatus according to an embodiment of the present invention. The apparatus shown in FIG. 1 has at least G3 and G4 facsimile communication functions, and an automatic answering function, and is connectable to an ISDN line.

Referring to FIG. 1, reference numeral 1 denotes a CPU for controlling the communication block of this embodiment. The CPU 1 incorporates a DMAC (Direct Memory Access Controller) and interrupt controller, and executes communication control (to be described later) in accordance with a program (to be described later) stored in a ROM 2. The program executed by the CPU 1 may be stored in a recording medium such as a floppy disk in place of the ROM 2.

Reference numeral 3 denotes a RAM which temporarily stores G3 or G4 facsimile transmission/reception data, or audio data processed by a G3 modem 6 (to be described later). The RAM 3 is partially used as a work area of the CPU 1.

Reference numeral 4 denotes a two-way parallel interface (I/F) which exchanges data with a reading/recording control block (to be described later). The two-way parallel I/F 4 complies with IEEE1284 (corresponding to so-called Centronics), and operates as a host in terms of hardware. The two-way parallel I/F 4 supports a nibble mode and ECP mode as data transfer modes in the reverse direction, and time-divisionally transfer data in the forward and reverse directions.

Reference numeral 5 denotes an HDLC (Highlevel Data Link Control Procedure) controller, which is used in a G4 communication mode. The HDLC controller 5 is in charge of layer 2 (Data Link) of the 7-layered structure of OSI supported by the G4 facsimile apparatus, and data transfer between the HDLC controller 5 and RAM 3 is controlled by the internal DMAC of the CPU 1. The protocols of layer 3 or higher are controlled by software of the CPU 1.

Reference numeral 8 denotes a switch circuit for selecting and connecting data routes from the HDLC controller 5 and a CODEC 7 (to be described later) to B1- and B2-channels of the ISDN line. At this time, the HDLC controller 5 and CODEC 7 can be individually connected to the B1- and B2-channels, and connecting both the HDLC controller 5 and CODEC 7 allows a so-called bulk communication. The switch circuit 8 operates under the control of the CPU 1.

Reference numeral 6 denotes the G3 (analog) modem which makes a G3 communication on ISDN under the control of the CPU 1. Transmission data in the RAM 3 is transferred to the G3 modem 6 by an interrupt process of the CPU 1, and reception data is transferred from the G3 modem 6 to the RAM 3 by an interrupt process. The G3 modem 6 makes a communication using an ISDN 3.1 kHz audio bearer service together with the CODEC 7.

The G3 modem 6 has an encoding/decoding function for audio data compression like in a known V.34 FAX modem, and exchanges audio data with the RAM 3. The audio communication of the G3 modem 6 is controlled by the CPU 1 and includes a so-called automatic answering function of automatically answering a call using an automatic answering voice message recorded in advance, and recording a voice message of a calling party.

Reference numeral 7 denotes the CODEC, which has a function of PCM (Pulse Code Modulation)-encoding an analog signal output from the G3 modem 6, and decoding PCM-encoded digital data input from the switch circuit 8 and supplying an analog signal to the G3 modem 6. The CODEC 7 may be connected to an analog port that connects another external telephone set, G3 facsimile apparatus, and other analog apparatuses. In this case, the apparatus shown in FIG. 1 has a function of a so-called TA (terminal adapter).

Reference numeral 9 denotes an ISDN line I/F which is constructed by an IC that supports layer 1 of ISDN and layer 2 of a D-channel, a transformer that keeps insulation between the line and apparatus, and the like. Layer 3 of the D-channel is controlled by software of the CPU 1. The ISDN line interface 9 corresponds to a DSU (digital service unit), and may comprise anlexternal DSU.

In the aforementioned arrangement, the RAM 3 temporarily stores transmission/reception facsimile data, and audio data. The facsimile data is read or recorded by the recording/recording control block (to be described later). In this case, the facsimile data is input/output via a RAM 33 (FIG. 2) in the reading/recording control block. That is, the RAM 3 which serves as a buffer does not have a large capacity, and the capacity of the RAM 33 is greatly larger than that of the RAM 3. The RAM 3 is not backed up, but the RAM 33 in the reading/recording control block can back up its storage contents for several hours even after the main power supply is turned off.

Facsimile communication data on the two-way parallel I/F 4 is exchanged using MMR (Modified Modified READ)-encoded data. Upon transmitting/receiving data other than MMR-encoded data, the communication control block converts that data under the control of the CPU 1. As a communication mode other than MMR, a G3 communication mode may be used. For example, MH (Modified Huffman)-encoded G3 data may be input to the G3 modem 6 to make a G3 communication.

As described above, audio data undergoes a transmission/reception process of the G3 modem 6. An audio signal is input/output by the reading/recording control block (to be described later). That is, audio data is input/output in the form of ADPCM (Adaptive Differential Pulse Code Modulation)-converted digital data on the two-way parallel I/F 4.

Figure 2:
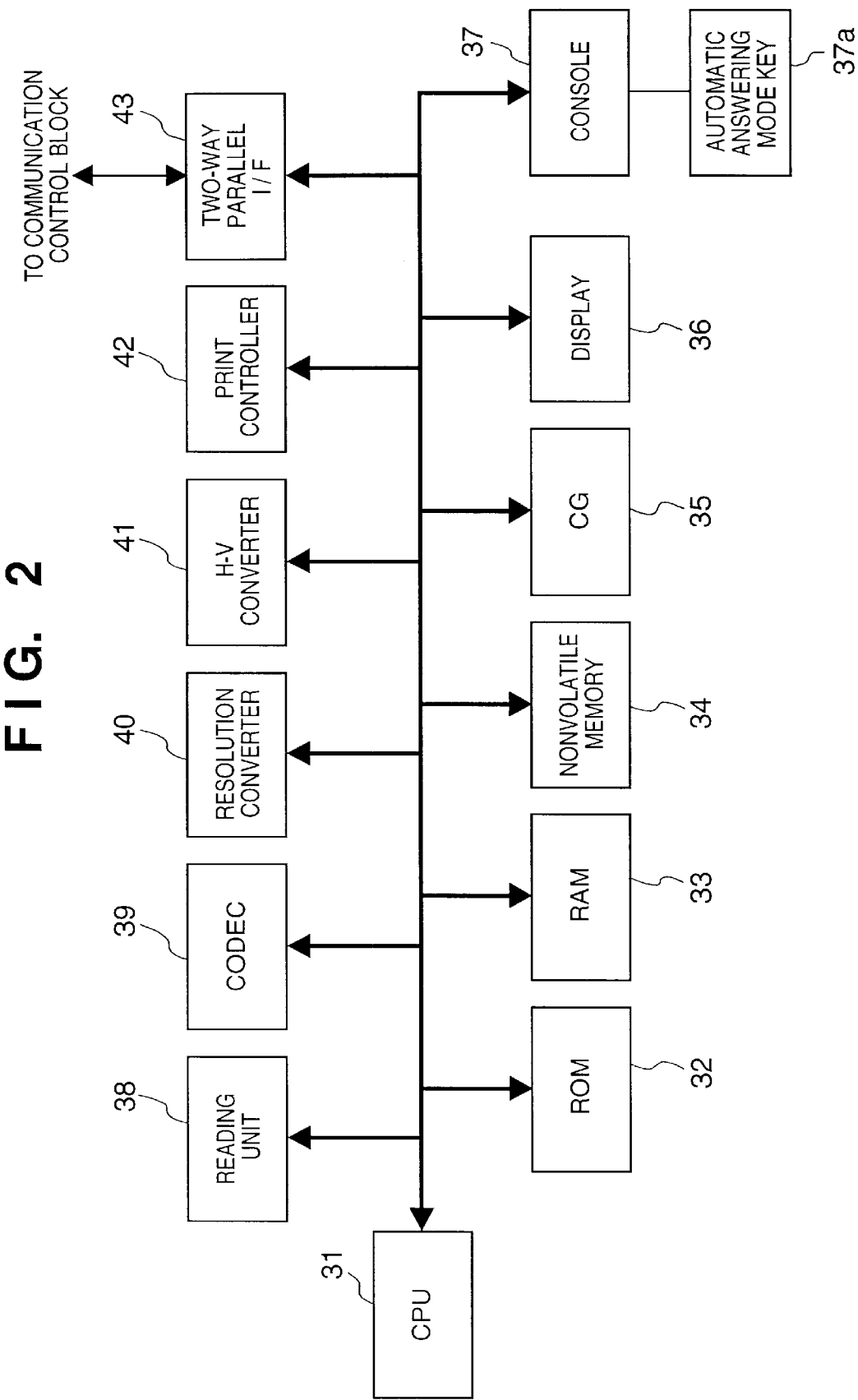
FIG. 2 is a block diagram showing the arrangement of a reading/recording controller of the apparatus shown in FIG. 1.

FIG. 2 shows the arrangement of the reading/recording control block of the apparatus shown in FIG. 1.

Referring to FIG. 2, reference numeral 31 denotes a CPU comprising, e.g., a microprocessor, which controls the RAM 33, a nonvolatile RAM 34, a character generator (CG) 35, a reader 38, a print controller 42, a console 37, a display 36, a CODEC 39, a resolution converter 40, an H-V converter 41, and a two-way parallel I/F 43 in accordance with a program stored in a ROM 32.

The RAM 33 stores binary image data read by the reader 38 or that recorded by the print controller 42, and stores encoded image data/ADPCM audio data to be output to the communication control block shown in FIG. 1 via the two-way parallel I/F 43, and encoded image data and ADPCM audio data input from the communication control block via the two-way parallel I/F 43.

The nonvolatile RAM 34 reliably stores data to be saved (e.g., abbreviated dial numbers and the like) even when the power supply is cut off. The nonvolatile RAM 34 also stores an automatic answering voice message used in the automatic answering mode.

The CG (character generator ROM) 35 stores characters of JIS codes, ASCII codes, and the like. The CG 35 outputs character data corresponding to a predetermined code as needed under the control of the CPU 31. The CG 35 is used for converting various kinds of information stored as character codes into images that can be transmitted/received (or recorded by the print controller 42) in a facsimile procedure.

The reader 38 comprises a DAM controller, image processing IC, image sensor, CMOS logic IC, and the like. The reader 38 binarizes image data read using a contact image sensor (CS), and sequentially sends the binary data to the RAM 33. Note that the set state of an original on this reader 38 can be detected by an original detector using a photosensor inserted in the original convey path of the reader 38.

The print controller 42 comprises a DAM controller, ink-jet recording apparatus (or a recording apparatus of another recording scheme), CMOS logic IC, and the like. The print controller 42 reads out recording data stored in the RAM 33 under the control of the CPU 31, and records it as a hard copy.

The console 37 is constructed by a key for starting image transmission, reception, and the like, a mode selection key for selecting an operation mode such as a resolution upon transmission/reception, a ten-key pad or one-touch keys for dialing, an automatic answering mode key for selectively setting an automatic answering/at-home mode. FIG. 2 illustrates an automatic answering mode key 37a which is important in the present invention as an independent block.

The display 36 is comprised of an LCD module that combines 7-segment LCDs for displaying time, icon LCDs for indicating various modes, a dot-matrix LCD that can make display for 5×7 dots×16 digits×1 line, and the like (or has these display functions), LEDs and so forth.

The CODEC 39 helps the CPU 31 decode encoded image data or encode raw image data. The CODEC 39 comprises a raw data/RL (runlength) conversion circuit, RL/raw data conversion circuit, and the like. All encoding/decoding functions of the CODEC 39 may be implemented by software of the CPU 31.

The resolution converter 40 converts the resolution of raw data which is obtained by the CPU 31 by decoding binary data stored in the RAM 33 via the reader 38 or received encoded data stored in the RAM 33 via the two-way parallel I/F 43 using the CODEC 39. For example, the resolution converter 40 converts 200 pels/inch as a standard resolution of facsimile data into 360 dpi as a resolution of the recording mechanism of the print controller 42, and so forth. The resolution converter 40 converts the resolution in only the main scanning direction, and stores the converted data in the RAM 33 again.

The horizontal-vertical (H-V) converter 41 prepares data in the main scanning direction, which corresponds to the width of an image, in correspondence with the number "a" of lines which is equal to the number "a" of nozzles of an ink-jet head, picks up "a" data at identical dot positions of the respective lines in the sub-scanning direction to obtain data to be supplied to the head, which are required in actual recording, and re-arranges them in the order of: data to be supplied to the head.

The two-way parallel I/F 43 complies with IEEE1284 as in the two-way parallel I/F 4 shown in FIG. 1. The two-way parallel I/F 43 serves as a peripheral in terms of hardware. The two-way parallel I/F 43 is connected to the communication control block shown in FIG. 1, and is used for storing reception data/audio data from the communication control block in the RAM 33, and sending transmission data/audio data stored in the RAM 33 to the communication control block. The two-way parallel I/F 43 also exchanges status and setup data between the two blocks shown in FIGS. 1 and 2.

In the above-mentioned arrangement, an automatic answering/recording function alone is taken into consideration as an audio communication. A handset for recording an automatic answering voice message, voice communications, and so on, and a circuit such as an A/D converter, amplifier, and the like may be added to the reading/recording control block (or connected to the G3 modem 6).

In the above-mentioned arrangement, the apparatus makes a facsimile communication using the G4 or G3 procedure. The apparatus can be set in the automatic answering mode using the automatic answering mode key 37a. In this case, the automatic answering/recording function that includes answering by means of an automatic answering voice message, automatic recording of a voice message of the calling party, and the like can be attained using the audio function of the G3 modem. In the G4 facsimile communication mode, a bulk communication that transmits/receives image data by connecting the HDLC controller 5, and both the B1- and B2-channels can be made.

The operation of the above arrangement will be described in detail below with reference to the operation flow chart shown in FIG. 3. In this embodiment, a bulk communication in the G4 communication mode is controlled in accordance with setups of the automatic answering mode. The sequence shown in FIG. 3 is executed by the CPU 1 shown in FIG. 1.

Figure 3:
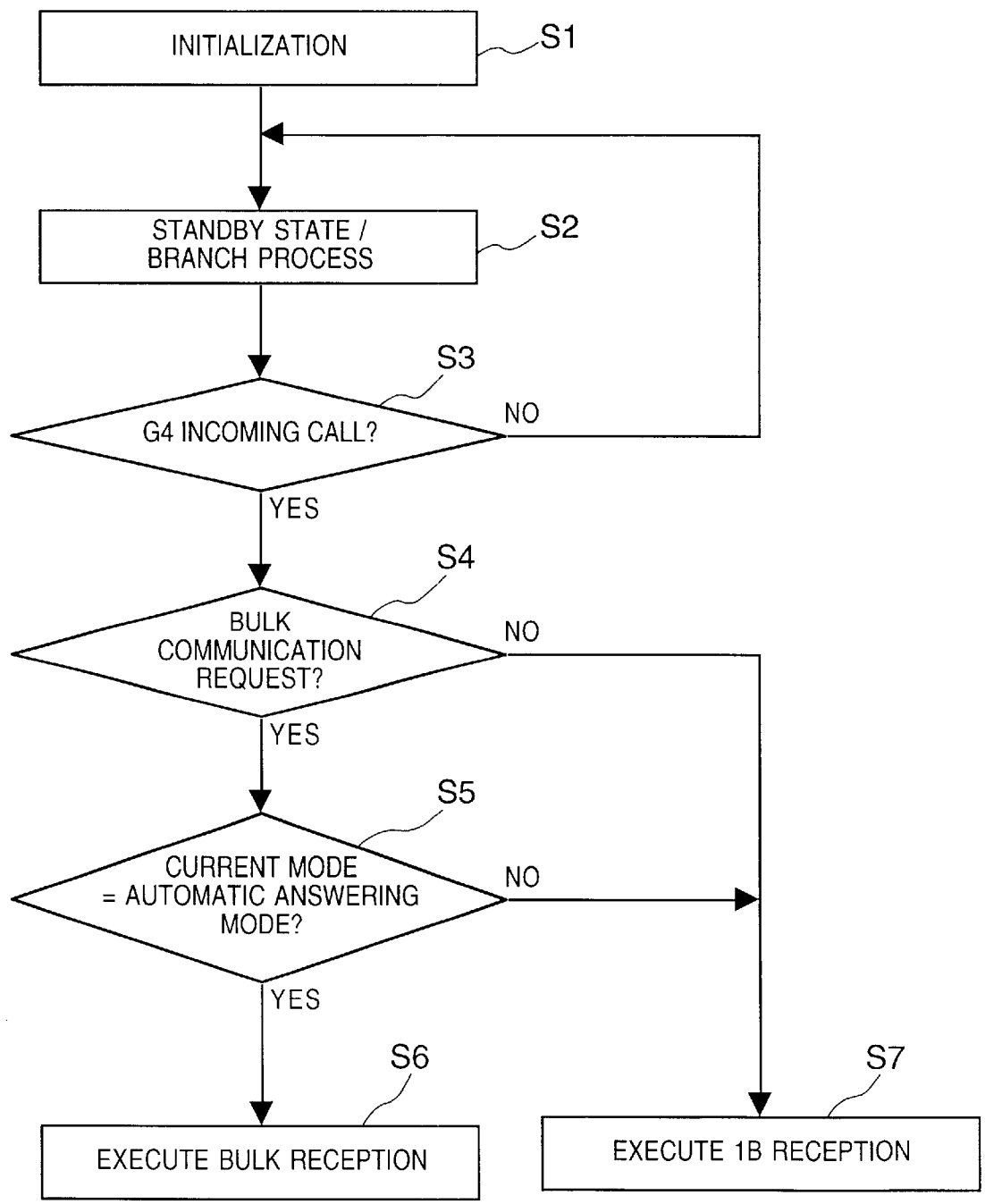
FIG. 3 is a flow chart showing the communication control of the first embodiment.

Step S1 shown in FIG. 3 is executed in response to main power ON (or reset), and executes initialization of the respective units.

Step S2 corresponds to the standby state of the respective functions of the apparatus, and the control branches to the requested process if some process start trigger is externally input: for example, a transmission request, voice communication (call origination) request, reception (call reception) request from the ISDN network, copy request, and the like. Although not shown in FIG. 3, when such process is requested, the corresponding process (not shown) is started.

It is monitored in step S3 if a call reception request (SETUP signal) comes from the ISDN network onto the D-channel. If the SETUP signal is received, the contents of the signal are analyzed, and if G4 call reception is determined based on BC (Bearer Capability) and HLC (High Layer Compatibility), the flow advances to step S4. If no SETUP signal is received, the flow returns to step S2, and the control waits for a request. If the SETUP signal is received but G4 call termination is not determined, the control branches to a corresponding process depending on the contents of SETUP. A detailed description of communication processes other than G4 will be omitted. For example, a voice communication in the automatic answering mode is executed after the control branches from step S2.

It is analyzed in step S4 if the calling party requests a bulk communication in the high-level layer protocol. If the bulk communication request is detected, the flow advances to step S5; otherwise, the flow advances to step S7.

Upon receiving the bulk communication request, it is checked in step S5 if the apparatus is set in the at-home or automatic answering mode. The automatic answering mode can be set by the automatic answering mode key 37a on the console 37. If the automatic answering mode is not set, the at-home mode is determined. The user can set/cancel the automatic answering/at-home mode using the automatic answering mode key 37a anytime he or she wants.

If it is determined in step S5 that the apparatus is currently set in the automatic answering mode, a reception process is done by bulk transfer according to the request of the calling party in step S6. More specifically, a message indicating that reception can be made by bulk transfer is supplied to the calling party, and the calling party places another call to transmit using the other B-channel in response to the message. In response to this call, the calling party and the apparatus shown in FIG. 1 are connected via both B1- and B2-channels (2B connection).

Data transmitted/received in this bulk communication is segmented into some blocks, which are sent using either one of the two B-channels. Each block is appended an ID, and the received blocks are assembled on the receiving side on the basis of the IDs to reconstruct identical data. During execution of bulk transfer, since the two B-channels of the ISDN line are busy, they cannot be used for another purpose.

On the other hand, if it is determined in step S4 that no bulk transfer request is received from the calling party, a normal reception process is done using one B-channel in step S7.

If it is determined in step S5 that the current mode is not the automatic answering mode but the at-home mode, a message indicating that only 1B reception is allowed is sent to the calling party, and the flow advances to step S7. In response to this message, the calling party makes a normal 1B communication in step S7. In this case, since only one of two B-channels is used, a call can be freely made or received by another digital telephone set, another G4 facsimile, a TA, an analog telephone set connected via the analog port connected to the CODEC 7, or the like, which are connected to the ISDN line.

According to the aforementioned embodiment, the user can make setups that pertain to bulk communication control, i.e., can determine whether or not a bulk communication is started on the basis of the setup state of the automatic answering mode of the apparatus, thus providing the following effects.

1) In the at-home mode, even when the calling party sends a bulk transfer request, that request is not accepted, and 1B reception is done. Hence, the user can use the other B-channel in transmission or a voice communication.

2) A facsimile apparatus with the automatic answering function normally has a mode selection key for selecting one of the automatic answering mode and at-home mode. Since it is automatically determined using this key whether or not bulk transfer is accepted, neither new mode setups nor operation key therefor are required.

3) Since bulk transfer is accepted in the automatic answering mode, the user can enjoy the merit of bulk transfer during this interval. More specifically, since the bulk transfer can communicate at 128 kbps that is twice the transfer rate (64 kbps) of a B-channel, data can be transferred within a shorter period of time. (For example, bulk transfer is made in the time band with a low line use fee to reduce the communication cost.)

4) In this embodiment, since the communication control block and reading/recording control block are independent from each other, the communication control block alone can easily be applied to other apparatuses. More specifically, the arrangement of the communication control block shown in FIG. 1 can be used in an apparatus such as a router, TA, or the like, or a communication apparatus such as a computer or the like which integrates these apparatuses.

5) In this embodiment, since the image storage area and audio storage area are allocated on a single RAM, the image storage area can be increased by changing the audio storage area. More specifically, the user who records voice messages frequently can reduce the image area, or the user who records voice messages not so frequently can increase the image area, thus effectively using the storage area 33.

6) In this embodiment, since a fixed automatic answering voice message is stored in the nonvolatile RAM 34, the communication control block shown in FIG. 1 does not require any nonvolatile RAM.

7) In this embodiment, since the facsimile apparatus that supports both the G4 and G3 facsimile communications includes an automatic answering telephone, even if the SETUP signal includes BC (Bearer Capability) indicating 3.1-kHz audio and no HLC (High Layer Compatibility), a reception process is started, and data can be received if the calling party is a G3 facsimile, or a voice message can be recorded if the calling party talks.

In the above description, the bulk communication is granted/denied in correspondence with the automatic answering mode. However, the present invention is not limited to the automatic answering mode, and the user may set to grant/deny the bulk communication in accordance with other operation modes of the apparatus. For example, when the polling mode is set, control may be made to grant the bulk communication (for the purpose of, e.g., high-speed transfer) or to deny it (so as to allow access from a larger number of stations).

As described above, unlike the conventional apparatus, since the user not only can simply set whether or not the bulk communication itself is accepted, but also can grant/deny the bulk communication in correspondence with the operation mode of the apparatus, appropriate bulk communication control can be done according to the use state of the apparatus.

Since the bulk communication is granted/denied in correspondence with the operation mode of the apparatus, whether or not the bulk communication is made can be automatically determined in accordance with the operation mode of the apparatus without requiring any extra setups.

Second Embodiment

In the arrangement for granting/denying a bulk communication in correspondence with the automatic answering mode that has been explained in the first embodiment above, the automatic answering mode can be considered as a kind of reception dedicated mode. That is, elaborating on this idea, the above arrangement grants/denies a bulk communication in relation to reception (call reception), and the control for granting/denying a bulk communication in relation to reception (call reception) can be independent from the control for granting/denying a bulk communication in relation to transmission (origination).

In other words, in place of the conventional arrangement that merely grants or denies a bulk communication for a set of reception (call reception) and transmission (origination), the control for granting/denying a bulk communication in relation to reception (call reception) can be done independently of the control for granting/denying a bulk communication in relation to transmission (origination).

According to such arrangement, a bulk communication can be granted (or denied) in relation to reception (call reception) alone or transmission (origination) alone.

More specifically, an appropriate user interface for the aforementioned setups is prepared using the display and console (36 and 37 in FIG. 2) of the apparatus, the user sets to independently grant/deny bulk communications for reception (call reception) and transmission (origination), and this setup information can be stored in a predetermined area of, e.g., the RAM 3 (or 33).

Upon reception (call reception), whether or not a bulk communication request from the calling party is accepted is determined with reference to this setup information. Upon transmission (origination), the setup information is referred to in a negotiation using a D-channel before communication to determine if a bulk communication is to be requested.

This embodiment will be explained below with reference to FIG. 4.

Figure 4:
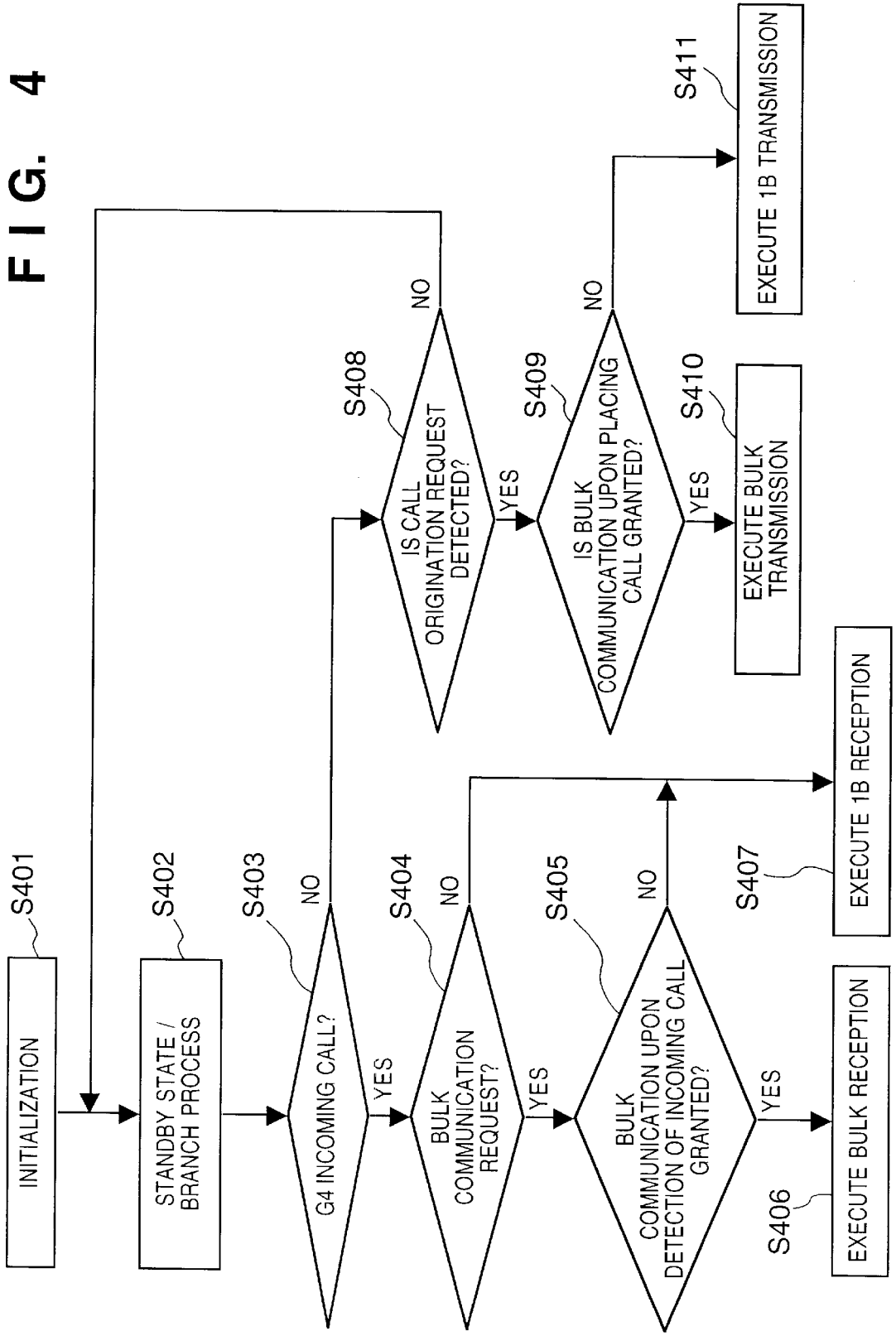
FIG. 4 is a flow chart showing the communication control of the second embodiment.

Step S401 shown in FIG. 4 is executed in response to main power ON (or reset), and executes initialization of the respective units.

Step S402 corresponds to the standby state of the respective functions of the apparatus, and the control branches to the requested process if some process start trigger is externally input: for example, a transmission request, voice communication (call origination) request, reception (call reception) request from the ISDN network, copy request, and the like. Although not shown in FIG. 4, when such process is requested, the corresponding process (not shown) is started.

It is monitored in step S403 if a call reception request (SETUP signal) comes from the ISDN network onto the D-channel. If the SETUP signal is received, the contents of the signal are analyzed, and if G4 call reception is determined based on BC and HLC, the flow advances to step S404. If no SETUP signal is received, the flow advances to step S408.

It is analyzed in step S404 if the calling party requests a bulk communication. If the bulk communication is requested, the flow advances to step S405; otherwise, the flow advances to step S407.

It is checked in step S405 if the apparatus is set to grant a bulk communication upon call reception (reception). If the apparatus is set to grant a bulk communication upon reception, a reception process is done by the bulk communication using the two B-channels in step S406. On the other hand, if it is determined in step S405 that the apparatus is set not to grant, a bulk communication upon call reception, the flow advances to step S407 to receive data using one B-channel.

It is checked in step S408 if a call is placed upon operation of the console 37. If a call is placed, the flow advances to step S409; otherwise, the flow returns to step S402.

If it is determined in step S408 that a call is placed, it is checked in step S409 if the apparatus is set to grant a bulk communication upon transmission (origination).

If it is determined in step S409 that the bulk communication upon transmission is granted, a bulk transmission process is done using the two B-channels in step S410; otherwise, transmission is done using one B-channel in step S411.

As described above, according to this embodiment, since the bulk communication can be independently controlled in correspondence with reception (call reception) and transmission (origination), it can be flexibly controlled in accordance with the user's purpose and demand. Hence, the conventional problem can be solved, i.e., whether or not a bulk communication is accepted can be prevented from being determined according to the intention on the transmitting side alone.

Third Embodiment

This embodiment presents an arrangement which can attain more flexible bulk communication control on the condition of a technique corresponding to resource BOD (Bandwidth On Demand) described in the prior art, i.e., a technique for automatically selecting 1B connection upon detection of an incoming or outgoing call to/from another analog/digital communication apparatus during a bulk (2B) communication.

In the following description, the same reference numerals denote the members that have already been explained with reference to FIGS. 1 and 2 or equivalent members, and a detailed description thereof will be omitted in principle.

Figure 5:
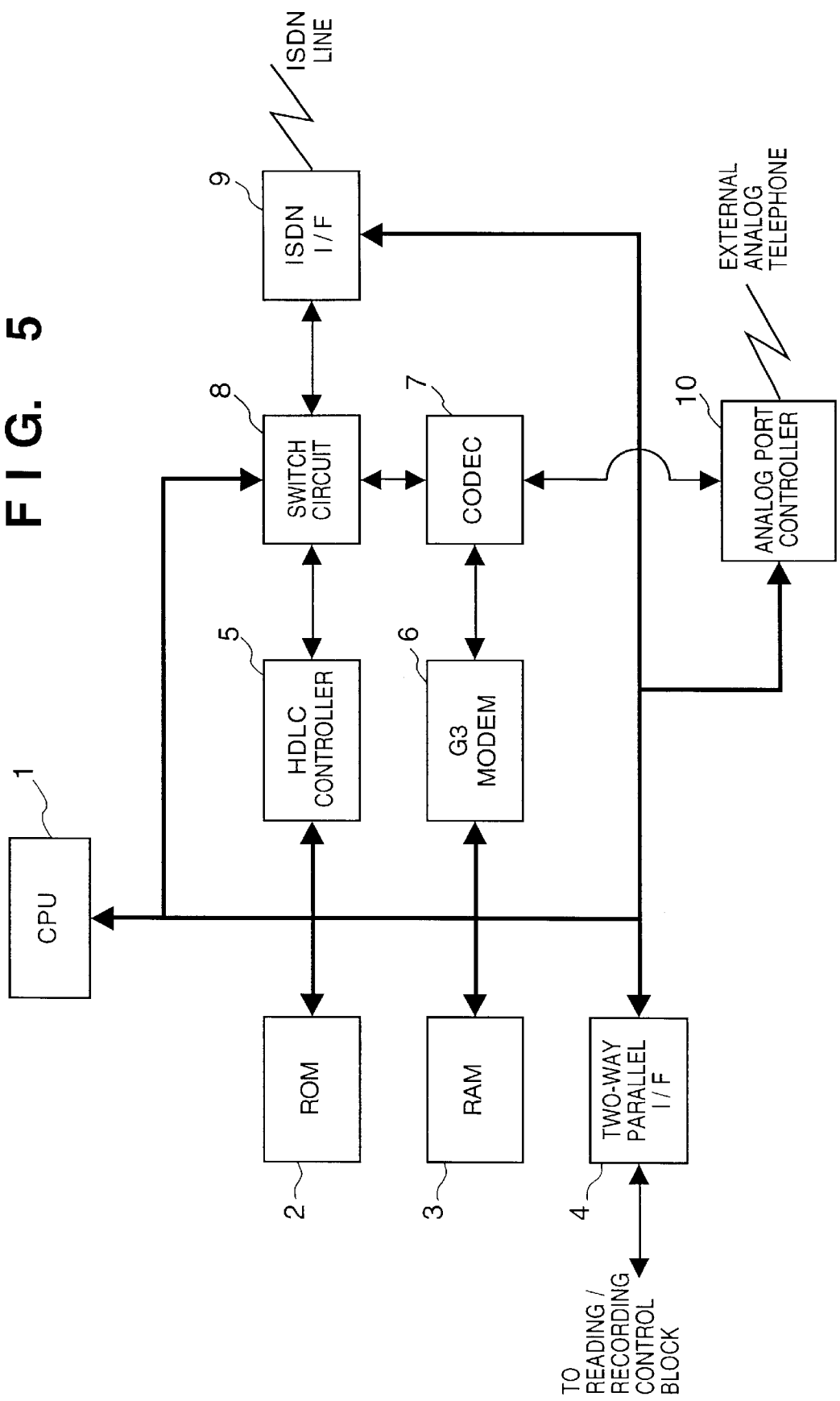
FIG. 5 is a block diagram showing the arrangement of a communication control block according to the third embodiment of the present invention.

FIG. 5 shows the arrangement of a communication control block of a facsimile apparatus of this embodiment.

Unlike the first embodiment in FIG. 1, an analog port controller 10 is added in this embodiment.

The analog port controller 10 allows use of an external analog telephone set (or an analog apparatus such as a G3 facsimile apparatus, modem, or the like), and has a DC supply function, CI (ringing signal) supply function, and a function of supplying various tone signals such as a busy tone, dial tone, ring-back tone, and the like. Furthermore, the analog port controller 10 detects off-hook of the analog telephone set based on the state of a DC loop, and detects the called party number by analyzing an outgoing call signal (DTMF or pulse) from the analog telephone set. Such detection is made under the control of the CPU 1, and the detection result is supplied to the CPU 1.

More specifically, the analog port controller 10 has a role of allowing use of an analog apparatus used so far without any modifications, and provides a function like that of a switching fabric of a PSTN (Public Switched Telephone Network).

The analog port controller 10 operates under the control of the CPU 1. An analog audio signal output from the external telephone set connected to the analog port controller 10 is input to the CODEC 7 via the analog port controller 10, is PCM-encoded, and is then output onto the ISDN network.

Conversely, digital PCM audio data coming from the ISDN network is decoded by the CODEC 7, and is output as an analog signal to the external analog telephone set via the analog port controller 10. Also, when an external analog apparatus is not a telephone, the audio signal is similarly input/output via the CODEC 7 and analog port controller 10.

When the user makes a call at the analog telephone set connected to the analog port controller 10, he or she picks up the handset of the analog telephone set and pushes dial keys. Then, a tone signal analysis circuit in the analog port controller 10 detects dial data, which is then sent to the CPU 1. The CPU 1 detects the called party number, and outputs a SETUP signal onto the D-channel to establish the D-channel. After that, the CPU 1 connects one B-channel to the external analog telephone set to allow the users to talk (or to communicate) via the aforementioned analog/digital conversion.

Note that the analog port controller 10 has a plurality of analog ports, which can receive a plurality of analog apparatuses. Also, different telephone numbers can be assigned to the analog apparatuses connected to such analog ports, and G3 modem 6 and G4 facsimile communication function in the apparatus shown in FIG. 5, and a dial-in service or selective calling using ISDN sub-addresses can be attained under the control of the CPU 1.

Since the arrangement of the reading/recording control block of this embodiment is the same as that shown in FIG. 2, a detailed description thereof will be omitted.

In this embodiment, when an incoming/outgoing call to/from the analog apparatus connected to the analog port controller 10 is detected during a bulk (2B) communication of the G4 facsimile function, or when the user is about to make another (G3 or G4) facsimile communication, whether or not control for selecting 1B connection by interrupting the bulk communication which is in progress can be set.

For this purpose, an appropriate user interface for the aforementioned setups is prepared using the display and console (36 and 37 in FIG. 2) of the apparatus, so that the user can set if the analog port can interrupt a bulk communication (G4 facsimile in this case) which is in progress on the digital side. The setup information that indicates if an interrupt is allowed is stored in a predetermined area of, e.g., the RAM 3 (or 33). When the analog port controller 10 has a plurality of analog ports and a plurality of analog apparatuses are connected thereto, whether or not a bulk communication can be interrupted is allowed to be set for each port, and the setup information is stored in units of ports.

The G3 and G4 facsimile functions of the apparatus are handled as virtual facsimile apparatuses (or virtual communication apparatuses such as "ports" or the like) on the appropriate interface for the aforementioned setups, so as to allow setup of each of these facsimile apparatuses (or "ports") as to whether or not a bulk communication can be interrupted, and the setup information is stored in units of facsimile apparatuses (or "ports").

Note that "no designation" in FIG. 6 is used when neither the analog apparatus nor the G4 or G3 facsimile function are designated upon call reception.

Figure 7:
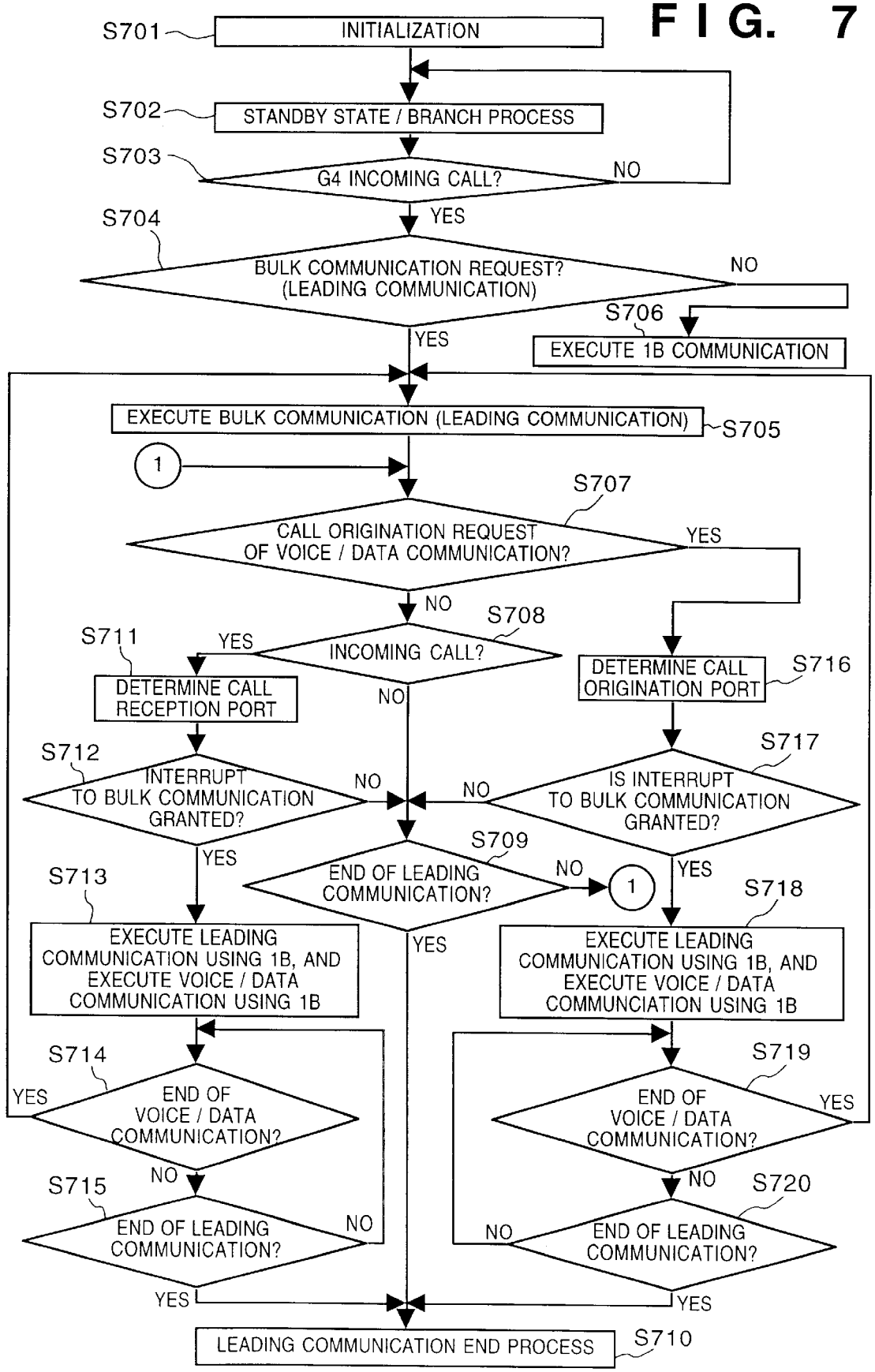
FIG. 7 is a flow chart showing the communication control of the third embodiment.

By executing control, as shown in the flow chart of FIG. 7, an interrupt to an ongoing bulk communication is controlled.

Note that execution of a bulk communication (S701 to S705) will be explained taking as an example a case wherein a bulk communication is designated upon call reception in FIG. 7. Also, this embodiment may be applied to a case wherein a bulk communication is designated and is executed upon origination.

Steps S701 to S704 and S706 in FIG. 7 are the same as steps S1 to S4 and S7 in FIG. 3, and a detailed description thereof will be omitted.

In this embodiment, upon detection of a bulk communication request in step S704, a "leading communication" is started in response to the request. More specifically, when the receiving side informs the transmitting side that reception can be made by a bulk communication, the transmitting side places another call to transmit data using the other B-channel as well. The receiving side accepts this call, thus connecting the G4 facsimile transmitting and receiving sides via the two B-channels.

If it is determined under the control of the CPU 1 in step S707 that the analog port controller 10 detects off-hook of the analog telephone set connected to the analog port, or the original detector in the reader 38 detects an original, and a called party number is dial-input at the console 37 and a start key is pressed to issue a transmission request, the flow advances to step S716. If neither of them are detected, the flow advances to step S708. More specifically, it is checked in step S707 if the apparatus connected to the analog port or another facsimile operation (in this case, a facsimile communication that generates an interrupt may be either G3 or G4 since it requests a 1B communication) interrupts a bulk communication.

If an interrupt to a bulk communication is detected in step S707, the flow advances to step S716 to detect the apparatus connected to the analog port that placed the call. At this time, if another facsimile operation is made at the console 37, a G4 or G3, communication is determined. It is then checked based on the setup information in the RAM 3 (33) shown in FIG. 6 in step S717 if an interrupt from the detected analog port or an interrupt by the facsimile operation is granted. If the interrupt is granted, the flow advances to step S718; otherwise, the flow advances to step S709.

If the interrupt from the analog port or that by the facsimile operation is not granted, an appropriate visual or audible alert message indicating that an interrupt to a bulk communication is not granted is preferably generated.

If the interrupt to the bulk communication is granted, the bulk communication that is in progress is switched to a normal communication using one B-channel by a negotiation (executed via the D-channel) between the transmitting and receiving sides, and a voice communication or facsimile transmission (or, polling reception or the like) requested in step S707 is executed using the other empty B-channel in step S718. The flow then advances to step S719.

It is checked in step S719 if the voice communication/transmission that has been started in step S718 is complete. If the voice communication/transmission is complete, the flow returns to step S705. If the leading communication is not complete yet, the leading communication is restored to a bulk communication and is continued. On the other hand, if the voice communication/transmission is not complete yet, the flow advances to step S720.

It is checked in step S720 if the leading communication is complete. If the leading communication is not complete yet, the flow returns to step S719; otherwise, the flow advances to step S710 to execute a leading communication end process, and the voice communication/transmission process that has been started in step S718 continues until it ends.

If neither call origination of the analog apparatus connected to the analog port nor that of another facsimile communication at the console 37 are detected in step S707, it is checked in step S708 if a new incoming call is detected. If no new incoming call is detected, the flow advances to step S709 to check if the bulk communication that has already been executed is complete. If a new incoming call is detected, the destination of the incoming call, i.e., one of the analog apparatuses connected to the analog ports, G3 function, and G4 function is detected. Note that this detection is made using the dial-in service or ISDN sub-address service.

It is then checked on the basis of the setup information in the RAM 3 (33) shown in FIG. 6 in step S712 if the corresponding analog port or facsimile function is granted reception of that call. If reception is not granted, the flow advances to step S709; otherwise, the bulk communication that is in progress is switched to a communication using one B-channel by a negotiation between the transmitting and receiving sides, and a voice or data communication corresponding to the incoming call is executed using the other empty B-channel in step S713. The flow then advances to step S714.

It is checked in step S714 if the voice or data communication that has been started in step S713 is complete. If the communication is complete, the flow returns to step S705. If it is determined in step S705 that the leading communication is not complete yet, the leading communication is restored to a bulk communication and is continued. On the other hand, if the voice or data communication is not complete yet, the flow advances to step S715 to check if the leading communication is complete. If the leading communication is not complete yet, the flow returns to step S714; otherwise, the flow advances to step S710 to execute a leading communication end process.

On the other hand, it is checked in step S709 if the current bulk communication is complete. If the bulk communication is not complete yet, the flow returns to step S707. Upon detection of completion, the flow advances to step S710.

In step S710, the communication end process is done, and the flow then returns to step S702 to set a standby state for the next process.

As described above, according to this embodiment, interrupts to a bulk communication can be independently granted or denied in units of analog apparatuses or facsimile communication functions (G4/G3) in the apparatus in correspondence with transmission (origination) and reception (call reception), and an interrupt to a bulk communication can be flexibly controlled in accordance with the user's demand. For example, control can be made so that a telephone set connected to a given analog port is granted interruption to a bulk communication upon receiving a call but is denied interruption upon placing a call therefrom. Such control can be implemented by storing the setup, information for incoming and outgoing calls in units of ports or facsimile communication functions in the RAM 3 (33) or by making the user set such information.

Hence, flexible setups depending on the user's purpose can be made, e.g., an analog port or facsimile (transmission or reception) function with high priority is granted interruption to a bulk communication but that with low priority is denied interruption. Hence, a bulk communication with high priority can be prevented from being interrupted by an apparatus with low priority.

Of course, according to the control for granting a given analog port or facsimile (transmission or reception) function interruption to a bulk communication, a bulk communication can shift to 1B+1B communications like in resource BOD control in a conventional TA or the like, and the user can effectively use the other B-channel for transmission or a voice communication, thus allowing effective use of channels.

As a feature unique to this embodiment, since the facsimile apparatus has a TA function, an external TA need not be connected to the facsimile apparatus, thus realizing down-sizing. When a telephone set is connected to the analog port, a voice communication request can be easily detected as off-hook.

In this embodiment, as in the first embodiment, since the communication control block is independent from the reading/recording control block, the communication control block alone can easily be applied to other apparatuses. That is, the arrangement shown in FIG. 5 can be used in an apparatus such as a router, TA, or the like, or a communication apparatus such as a computer or the like which integrates these apparatuses.

Fourth Embodiment

The third embodiment has exemplified an arrangement that connects analog apparatuses using analog ports. In this embodiment, an arrangement which additionally has a rate/protocol converter for connecting a personal computer, i.e., a so-called digital port (or a network interface), in other words, an arrangement that incorporates a function of a terminal adapter or router which is prevalently commercially available will be exemplified. With such arrangement, bulk communication control nearly equivalent to that in the third embodiment can be realized.

Figure 8:
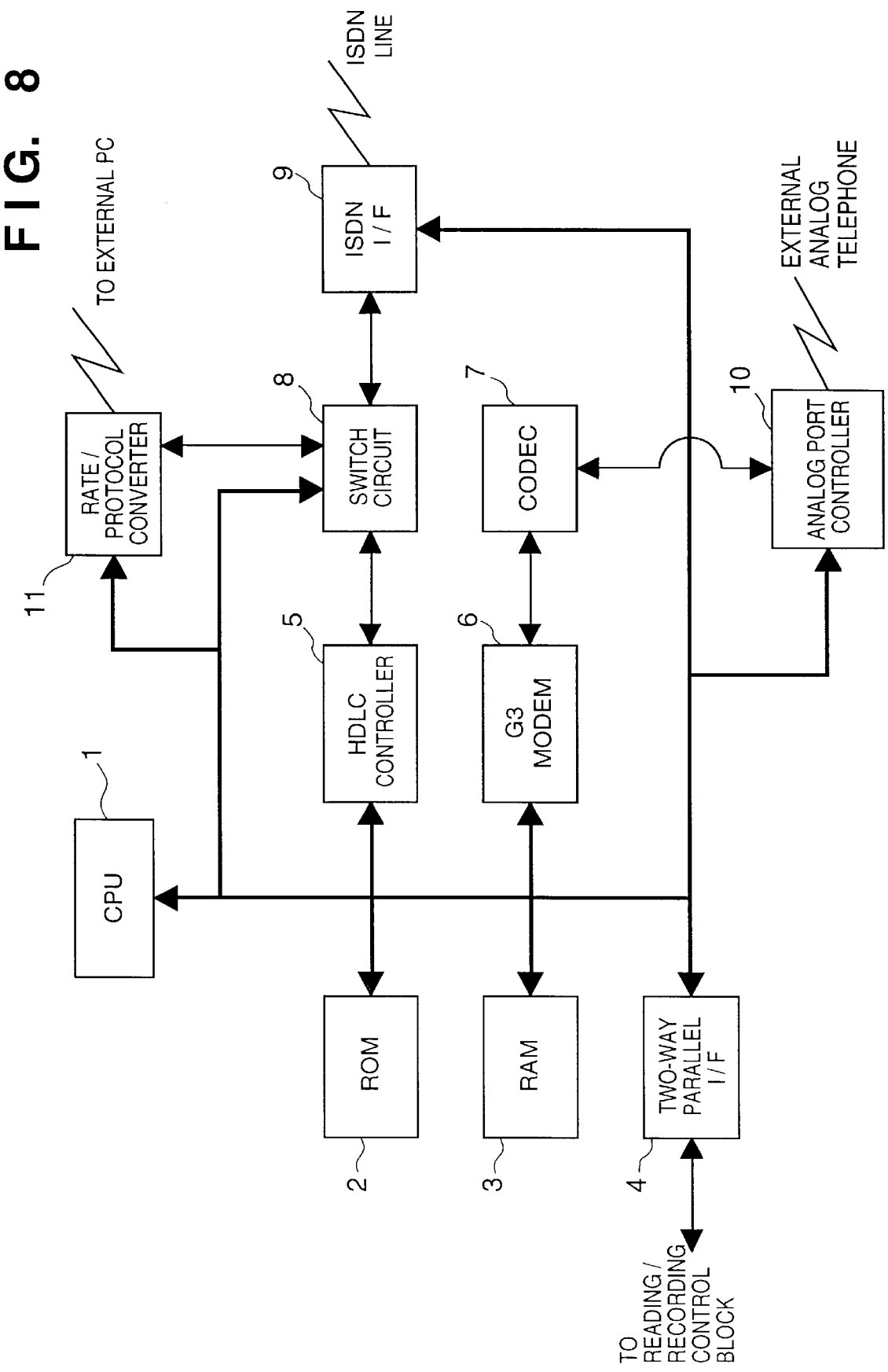
FIG. 8 is a block diagram showing the arrangement of a communication control block according to the fourth embodiment of the present invention.

FIG. 8 shows the arrangement of a communication control block of a facsimile apparatus of this embodiment. The difference between this embodiment and the third embodiment lies in that a rate/protocol converter 11 for connecting an external personal computer (to be also simply referred to as a PC hereinafter) or a (local) network is provided in addition to the analog port controller 10 which is also provided to the third embodiment.

The rate/protocol converter 11 is connected to the external PC or (local) network via a known arbitrary interface such as a predetermined parallel or serial interface (for example, RS232C, USB, IEEE1394 bus, Ethernet interface, or the like) or the like.

The external PC is connected to this apparatus to connect an Internet service provider via this facsimile apparatus and mainly the ISDN network, and to use various functions of the Internet. In this case, the arrangement of the most prevalent rate/protocol converter 11 is to connect the PC with an asynchronous PPP (Point to Point Protocol) to an Internet service provider having a dial-up IP access point of synchronous 64 kbps.

In case of the ISDN, arbitrary protocols can be used in layers higher than the network layer, and not only the above-mentioned PPP and G4 facsimile communication but also synchronous communications specified in V.110 recommendation, X.25 recommendation, and the like of ITU-T recommendations can be made. Hence, the rate/protocol converter 11 is not particularly limited as long as it can perform rate/protocol conversion between these protocols on the ISDN and an asynchronous (or synchronous) communication protocol of the PC or (local) network.

In the following description, the rate/protocol converter 11 is connected to the external PC via an RS232C interface, and the PC makes TCP/IP communications on the ISDN. In incoming/outgoing call control, the rate/protocol converter 11 and external PC exchange a telephone number and the like using Hayes commands (so-called AT command sets).

In this embodiment, the switch circuit 8 operates to selectively connect the data routes of the HDLC controller 5 and CODEC 7, and the rate/protocol converter 11 to B1- and B2-channels of the ISDN line. Of course, two of these devices can be respectively connected to the B1- and B2-channels, and in case of a bulk communication, one of two digital systems of the HDLC controller 5 and rate/protocol converter 11 is connected to both the B1- and B2-channels (2B).

Figure 9:
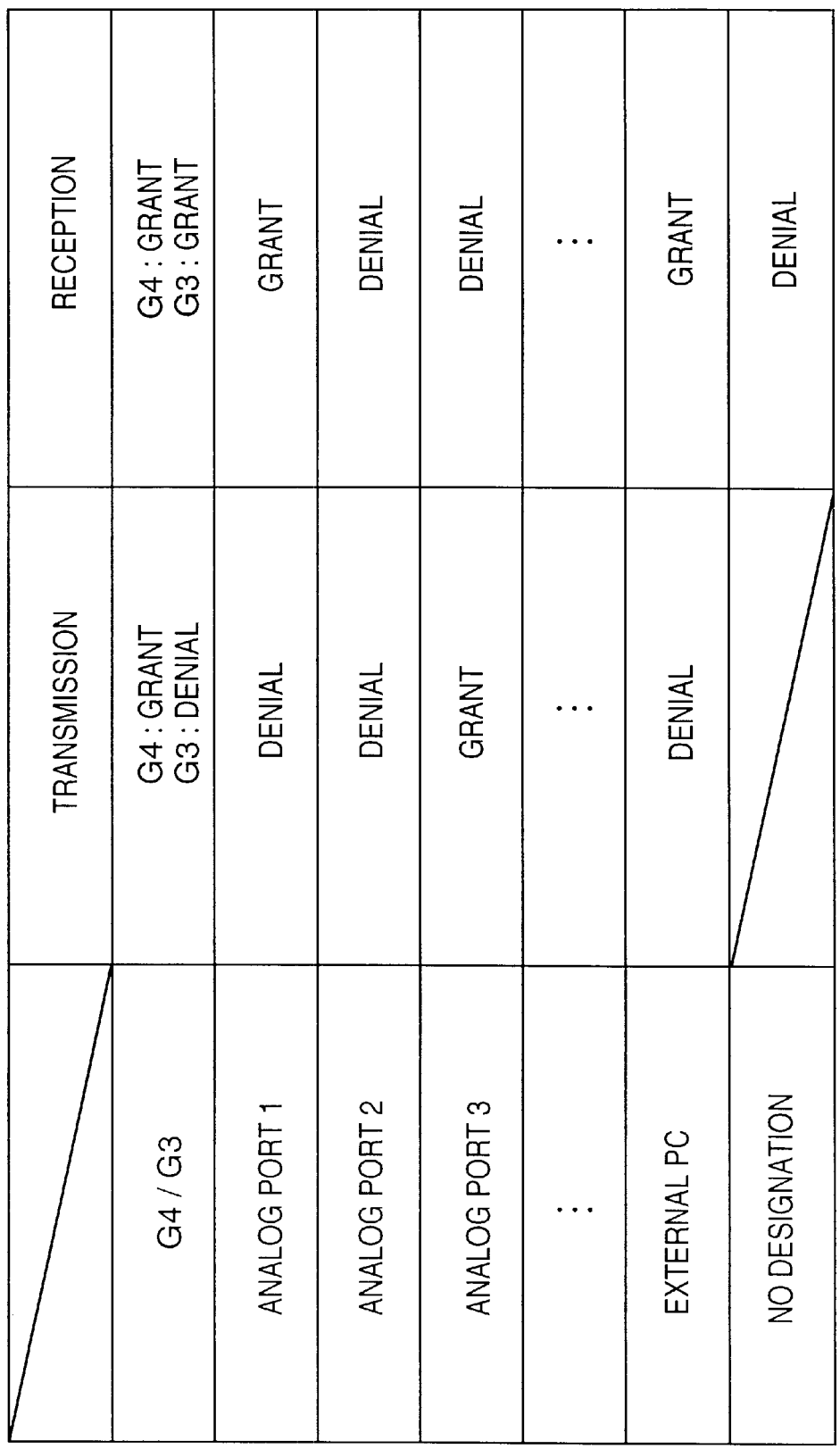
FIG. 9 is a table showing an example of communication control setups in the fourth embodiment.

In this embodiment, the user interface used for setting if an interrupt to a bulk communication is granted, or the setup information area on the RAM 3 (33) is implemented as in the third embodiment. In this case, in addition to setups as to whether or not an interrupt from the analog port or by facsimile operation to a bulk communication is granted, whether or not an interrupt from the external PC to a bulk communication is granted can be set, as shown in FIG. 9, and the bulk communication is controlled, as shown in FIG. 10.

Figure 10:
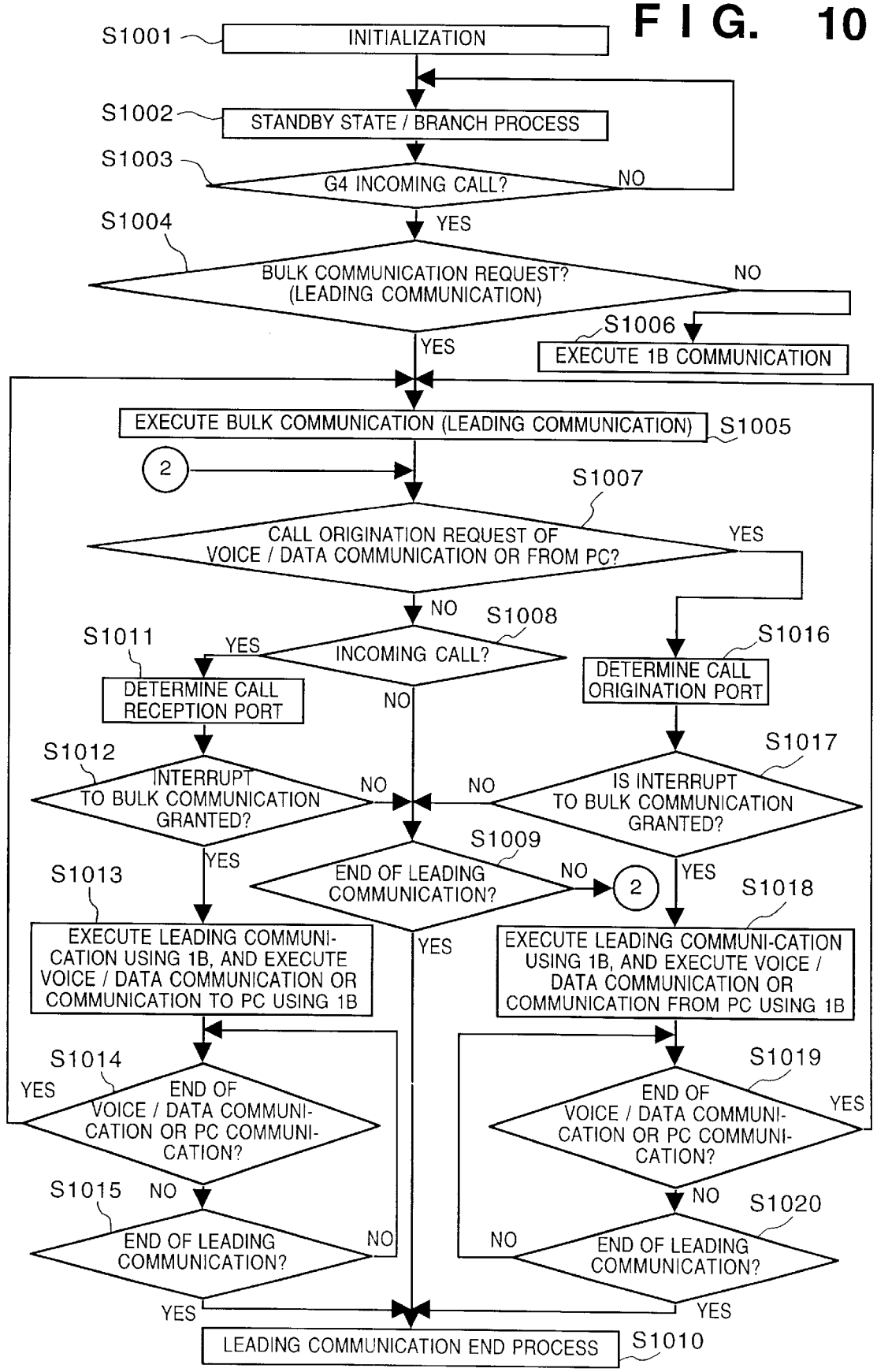
FIG. 10 is a flow chart showing the communication control of the fourth embodiment.

FIG. 10 shows the control of the arrangement shown in FIG. 8, and its flow is substantially the same as that shown in FIG. 7 as can be seen from comparison with FIG. 7.

Unlike FIG. 7, it is detected in step S1007 if a PPP connection request, i.e., a connection request to the Internet service provider is issued using Hayes commands (so-called AT command sets) via the rate/protocol converter 11 in addition to an interrupt by the analog port and facsimile operation. Also, the PC connected via the rate/protocol converter 11 is added in determining the port that placed a call in step S1016. Furthermore, the PC connected via the rate/protocol converter 11 is added in determining the port designated upon receiving a call in step S1011.

Accordingly, it is checked in step S1017 if an interrupt from the external PC to a bulk communication is granted in addition to checking if an interrupt from the analog port of interest or facsimile operation to a bulk communication is granted.

If an interrupt is granted, the apparatus that has generated the interrupt starts a communication by interrupting the bulk communication (2B→1B+1B) in steps S1018 to S1020.

In step S1012, it is checked if a bulk communication can be interrupted by an incoming call to the external PC, in addition to checking if a bulk communication can be interrupted by an incoming call to the analog port or facsimile function. If an interrupt is granted, the apparatus that has received a call starts communication by interrupting the bulk communication in steps S1013 to S1015.

As described above, in addition to the apparatuses connected to the analog ports and the G3 or G4 facsimile communication function in the apparatus, whether or not an interrupt (2B→1B+1B) by the external PC, connected to the rate/protocol converter 11 to a bulk communication is granted/denied can be set in units of outgoing and incoming calls, and an interrupt to the bulk communication can be flexibly controlled in accordance with the user's demand.

In this embodiment as well, the communication control block alone can be applied to other apparatuses, as described above. In addition, when the rate/protocol converter 11 is constructed by a conversion circuit with a network interface such as Ethernet, this arrangement corresponds to the router described in the modification of the second embodiment.

Fifth Embodiment

In the third and fourth embodiments, interrupt control to only a bulk communication which is in progress has been described. As shown in FIG. 11, the user may allow different setups depending on whether a bulk communication is started in response to calling operation at the console 37 or an instruction from the calling party upon call reception.

With such setups, flexible control that can reflect the user's will can be realized.

Various embodiments of possible user setups associated with the bulk communication control of ISDN communication apparatuses have been explained: the user setups (first and second embodiments) that pertain to control for independently granting/denying a bulk communication in correspondence with the automatic answering mode of the apparatus or in relation to reception (call reception) and transmission (origination), and the user setups (third to fifth embodiments) that pertain to control for shifting from a bulk communication to a normal, non-bulk communication in response to an interrupt from a communication means which is different from the one which is executing the bulk communication.

Note that the individual arrangements described in the above embodiments can be arbitrarily combined and used within the scope of the appended claims.

The above explanation has been given on the condition of the 2B+D channel configuration. However, the channel configuration is not limited to such specific one, and the number of channels which are simultaneously used in a bulk communication is not limited to two B-channels.

Also, a method of controlling a communication apparatus of the present invention can be stored not only in the ROM (2 or 32) but also in a computer readable recording medium such as a hard disk, floppy disk, or the like, which stores a program of the CPU (1 or 31) when the communication apparatus is built using a computer system.

As can be apparent from the above description, according to the present invention, various excellent effects can be expected as follows.

More specifically, when a bulk communication that simultaneously uses a plurality of channels or a normal communication using a single channel is made to a single partner station, since the arrangement which can independently control grant or denial of the bulk communication in correspondence with reception and transmission is used, the bulk communication can be flexibly controlled in accordance with the user's purpose and demand. Hence, the conventional problem can be solved, i.e., grant or denial of the bulk communication can be prevented from being determined by the intention on the transmitting side alone.

Also, when a bulk communication that simultaneously uses a plurality of channels or a normal communication using a single channel is made to a single partner station, since the arrangement which determines whether or not a bulk communication is made in response to a request from the partner station, in correspondence with the current operation mode of the apparatus, is used, whether or not the bulk communication is made can be automatically determined in correspondence with the operation mode of the apparatus without requiring any extra setups.

Furthermore, according to the arrangement which grants a bulk communication if the current mode of the apparatus is an automatic answering mode that enables the automatic answering function, and denies it if the current operation mode of the apparatus is not the automatic answering mode, whether or not the bulk communication is made can be automatically determined in correspondence with the setup state of the automatic answering mode without requiring any extra setups. Hence, a bulk communication with high communication efficiency can be done in only the automatic answering mode set when the user is absent.

Moreover, when a bulk communication that simultaneously uses a plurality of channels or a normal communication using a single channel is made to a single partner station, since the arrangement which makes a user setup for granting or denying each of a plurality of communication units interruption to a bulk communication which is being executed by a first communication unit and making a normal communication upon generation of a communication request using a second communication unit different from the first communication unit during execution of the bulk communication by the first communication unit, and controls an interrupt from the second communication unit to the bulk communication during execution of the bulk communication by the first communication unit in accordance with the user setup, is used, interrupts to the bulk communication can be independently and flexibly controlled in units of communication units in accordance with the user's demand. Hence, the conventional problem can be solved, i.e., the bulk communication which is being executed by a communication unit with high priority can be prevented from being interrupted by a communication unit with low priority.

In addition, using the arrangement which independently controls interrupts from the second communication unit to the bulk communication in correspondence with reception and transmission, interrupts to the bulk communication can be independently and flexibly controlled in units of communication units and their reception and transmission processes in accordance with the user's demand.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:

setting means for setting an automatic answering mode for automatically answering an incoming call, and recording a voice message from a calling party;

communication means capable of communicating with a partner via a plurality of communication channels;

a detecting means for detecting whether a bulk communication request is received from the calling party; and control means for selectively controlling a communication with the partner via either the plurality of communication channels or a single channel in accordance with whether or not the automatic answering mode has been set, wherein said control means sends a message to the calling party indicating that the bulk communication can be made.

2. The apparatus according to claim 1, further comprising: detection means for detecting an incoming call, and wherein said control means makes the control when said detection means detects the incoming call.

3. The apparatus according to claim 1, wherein said communication means makes a communication via a digital line.

4. The apparatus according to claim 3, wherein the digital line is an integrated services digital network.

5. A method of controlling a communication apparatus comprising:

a setting step of setting an automatic answering mode for automatically answering an incoming call, and recording a voice message from a calling party;

a communication step of communicating with a partner via a plurality of communication channels;

a detecting step of detecting whether a bulk communication request is received form the calling party; and a control step of selectively controlling a communication with the partner via either the plurality of communication channels or a single channel in accordance with whether or not the automatic answering mode has been set, wherein said control step sends a message to the calling party indicating that the bulk communication can be made.

* * * * *

UNITED STATES PATENT AND TRADEMARK OFFICE
CERTIFICATE OF CORRECTION

PATENT NO.     : 6,771,752 B1
DATED          : August 3, 2004
INVENTOR(S)    : Yuji Kurosawa It is certified that error appears in the above-identified patent and that said Letters Patent is hereby corrected as shown below:

Title page,
Item [56], References Cited, U.S. PATENT DOCUMENTS, please add the following:
-- U.S. Patent No. 5,579,127 --

Signed and Sealed this

Ninth Day of November, 2004

JON W. DUDAS
*Director of the United States Patent and Trademark Office*